United States Patent
Pellarin

(10) Patent No.: US 9,269,261 B2
(45) Date of Patent: Feb. 23, 2016

(54) COMMUNICATION METHOD AND DEVICE FOR REMOTE CONTROL OF AN ACTUATOR FOR MOBILE EQUIPMENT IN A BUILDING

(71) Applicant: SOMFY SAS, Cluses (FR)

(72) Inventor: Florent Pellarin, Pringy (FR)

(73) Assignee: SOMFY SAS (FR)

( * ) Notice: Subject to any disclaimer, the term of this patent is extended or adjusted under 35 U.S.C. 154(b) by 0 days.

(21) Appl. No.: 14/376,405

(22) PCT Filed: Jan. 30, 2013

(86) PCT No.: PCT/FR2013/050182
§ 371 (c)(1),
(2) Date: Aug. 1, 2014

(87) PCT Pub. No.: WO2013/114036
PCT Pub. Date: Aug. 8, 2013

(65) Prior Publication Data
US 2014/0378061 A1    Dec. 25, 2014

(30) Foreign Application Priority Data
Feb. 2, 2012   (FR) ...................................... 12 50966

(51) Int. Cl.
*G08C 17/02* (2006.01)
*H04W 4/00* (2009.01)

(52) U.S. Cl.
CPC ............... *G08C 17/02* (2013.01); *H04W 4/008* (2013.01); *G08C 2201/20* (2013.01); *G08C 2201/91* (2013.01)

(58) Field of Classification Search
CPC ............................... G08C 17/02; H04W 4/008
USPC ........................................ 455/41.1, 41.2, 41.3
See application file for complete search history.

(56) References Cited

FOREIGN PATENT DOCUMENTS

WO    2005119621 A1    12/2005
WO    2011063182 A1    5/2011

OTHER PUBLICATIONS

International Search Report issued May 2, 2013 re: PCT/FR2013/050181; citing: WO 2011/063182 A1 and WO 2005/119621 A1.
International Search Report issued Apr. 5, 2013 re: PCT/FR2013/050182; citing: WO 2011/063182 A1 and WO 2005/119621 A1.

*Primary Examiner* — Tuan H Nguyen
(74) *Attorney, Agent, or Firm* — Cantor Colburn LLP

(57) ABSTRACT

The present invention relates to an operating method for a communication device (DC) for remote control of an actuator (ACT) for a piece of mobile equipment (ME) in a building, comprising the steps consisting of: analysing a first received signal (RS) to determine if at least one sequence of the first received signal (RS) can be interpreted as being in accordance with a configuration communication mode which can be used by the communication device (DC); on receipt of at least one sequence of the first received signal which is in accordance with a configuration mode, defining said configuration communication mode (MCi) as the identified configuration communication mode; defining an operational communication mode (MUO) on the basis of the identified configuration communication mode (MCi); receiving a second signal (RS2) according to the operational communication mode (MUO); and interpreting the second received signal (RS2) according to the operational communication mode (MUO), in such a way as to identify control data in the second received signal (RS2).

14 Claims, 3 Drawing Sheets

COMMUNICATION METHOD AND DEVICE FOR REMOTE CONTROL OF AN ACTUATOR FOR MOBILE EQUIPMENT IN A BUILDING

TECHNICAL FIELD

The present invention relates to a communication device for the remote control of an actuator for a building mobile equipment such as a roller shutter, a blind or a curtain and a configuration method of such a device.

BACKGROUND

It is known to use a communication device comprising a receiver and a data processing unit intended to receive a signal coming from the receiver and process this received signal as a frame of a communication mode.

Such a type of known device allows in particular carrying out the remote control of an actuator for a building mobile equipment, particularly of the closing type, for example a door, a gate or a window, or of the sun protection, the multimedia projection screen or even the ventilation hatch type.

Different existing types of communications protocols allow carrying out such a remote control. Particularly, document EP1696402 describes such a type of protocol. Protocols known under the names corresponding to registered trademarks RTS®, io-homecontrol®, z-wave®, or Zigbee® are also used for these purposes.

It appears however that the frequency bands usable for a communication on the basis of the aforementioned protocols are distinct according to countries or different regions. Thus, each device should be specific to one type of protocol and one determined frequency band, and is thus specific to a country or a given region.

This absence of harmonization of the authorized and thus usable radio frequencies between the countries leads to the manufacture of products specific to each country so that this product communicates on the authorized frequency band.

A production strategy of this type tends to segment the production of the product batches, each batch being specific to an area corresponding to a set of countries or regions that use the same types of frequency bands and/or protocols, and to use different product references for each distinct batch.

This results in an increase in the costs and complexity of manufacture of the products, given the significant number of batches and their small size. Similarly the product testings are multiplied by the number of batches. Finally, a significant non-moving stock is constituted because a batch can only be sold in the area specific to it, and it is not possible to use the stock of a given batch to compensate for an exceptional request concerning a different area.

BRIEF SUMMARY

The purpose of the present invention is to solve all or part of the aforementioned drawbacks.

To this end, the present invention relates to a functioning method of a communication device for the remote control of an actuator for a building mobile equipment comprising the steps of:

a) analyzing a first received signal in order to determine whether at least one sequence of the first received signal may be interpreted as being compliant with a configuration communication mode usable by the communication device;

b) upon receiving at least one sequence of the first received signal compliant with a configuration communication mode, defining said configuration communication mode as an identified configuration communication mode;

c) defining an operational communication mode depending on the identified configuration communication mode;

d) receiving a second signal according to the operational communication mode;

e) interpreting the second received signal in accordance with the operational communication mode, so as to identify control data in the second received signal;

Thanks to the arrangements according to the invention, a configuration or an automatic reconfiguration of the communication mode used by the device is possible, thus allowing using a same type of device for multiple operational communication modes.

By way of example, for a device being part of an actuator for a mobile equipment, the method may be implemented during an operation carried out during the installation of the actuator on site, for example end of travel adjustment or pairing.

The operational communication mode of the device may be modified again, carrying out the steps of the method during an update, a reset, a maintenance or parametrization phase of the device.

The incident signals which allow identifying the operational communication mode to be used may be provided by a remote control which is specific to the used communication mode, particularly a unidirectional remote control. This remote control may communicate through a particular communication mode. The device uses this reference in order to define its own communication mode. It is also possible to use a dedicated tool allowing generating the frames of incident signals towards the device.

The risk of bad adjusting of the communication mode is zero in practice because two distinct communication modes may be differentiated in particular by: the frequency, the modulation, the Flow rate, the data format, the received data and the transmission error check codes.

Thanks to the arrangements of the invention, a decrease in the number of device references may be obtained, which allows an optimized manufacture of the corresponding products. Adapting the products to new communication modes is further facilitated. In fact, it is sufficient to introduce new parameters corresponding to new communication modes in the programming of the communication device. In this way, the communication device has several selectively usable communication modes, allowing the implementation of the functioning modes described in the rest of this document.

According to an aspect of the invention, the definition of the operational communication mode is achieved depending on a received signal according to the configuration communication mode on the one hand, and data related to predetermined relationships between the configuration communication modes and user communication modes on the other hand.

This definition of the operational communication mode may be qualified as being implicit, because the definition data are not contained in the received signal according to the configuration communication mode, but in data stored in the device which establish a relationship between a configuration communication mode and an operational communication mode.

According to another aspect of the invention, the definition of the operational communication mode is achieved by defining the operational communication mode as being the identified configuration communication mode.

This arrangement allows defining simply the operational communication mode from an incident signal, for example a remote control intended to be used with the communication device.

According to another aspect of the invention, the analysis of a received signal for identifying whether at least one sequence of the received signal may be interpreted as being compliant with a configuration communication mode usable by the communication device comprises the checking of the compatibility of the frame format of a received signal with a frame format of a type of protocol corresponding to said configuration communication mode.

According to another aspect of the invention, the analysis of a received signal for identifying whether at least one sequence of the received signal may be interpreted as being compliant with a configuration communication mode usable by the communication device comprises the checking of the conformity of a sequence of received signal with the preamble of a frame belonging to the type of protocol corresponding to said configuration communication mode.

These arrangements allow checking simply the conformity of the received signal with a selected communication mode, by being based in particular, on the recognition of the preamble of a protocol frame. The recognition of this preamble allows confirming that the radio-frequency decoding, the decoding of the binary elements, the Flow rate and the sequence of the signal are compliant with that of the selected communication mode, which in most cases is sufficient for its characterization.

According to another aspect of the invention, the analysis of a received signal for determining whether at least one sequence of the received signal may be interpreted as being compliant with a configuration communication mode usable by the communication device comprises the comparison between an error check code calculated from data of the received signal on the one hand and the value of an error check code comprised within a frame of received signal on the other hand.

According to another aspect of the invention, the analysis of the received signal as sequence compliant with a configuration communication mode usable by the device comprises:

a') Selecting a particular configuration communication mode from among a plurality of configuration communication modes usable by the communication device, b') Waiting for the reception of a signal during a determined time interval, c') If no signal is received within the determined time interval, returning to step a') of selecting a particular configuration communication mode by selecting another configuration communication mode from among the plurality of configuration communication modes usable by the communication device, d') If a signal is received within the determined time interval, proceeding to an attempt of interpreting the received signal according to the selected configuration communication mode, e') If at least one sequence of the received signal may be interpreted as being compliant with the selected configuration communication mode, defining said selected communication mode as an identified configuration communication mode, f') If the received signal is not interpreted as being at least partly compliant with the selected configuration communication mode, returning to step a') of selecting a particular configuration communication mode by selecting another configuration communication mode from among the plurality of configuration communication modes usable by the communication device, According to another aspect of the invention, a configuration of the communication device is achieved subsequently to the selection of a configuration communication mode.

According to another aspect of the invention, distinct configuration communication modes usable by the communication device correspond to different types of communications protocols, and/or to communications on distinct frequency bands.

The present invention also relates to a communication device for the remote control of an actuator for a building mobile equipment comprising a receiver and a data processing unit intended to receive a signal from the receiver and interpret this signal in accordance with a configuration or operational, communication mode, the communication device being arranged to implement a method such as described previously.

Thus, the device presents a first functioning mode called configuration functioning mode corresponding to the first steps a) b) and c) of the method and a second functioning mode called operational functioning mode corresponding to steps d) and e) of the method, in which the operational communication mode is used to receive control signals.

According to an aspect of the invention, the processing unit is arranged in order to configure the receiver so as to allow a reception in a determined frequency band.

According to one aspect of the invention, the receiver is a communication component by radio-frequency waves.

According to other aspects of the invention:
the receiver allows a communication at frequencies ranging between 200 MHz and 1 GHz.
the receiver allows a communication at frequencies ranging between 500 MHz and 1 GHz.

It is also possible that the frequency bands used are discontinuous, with for example a first frequency band around 433 MHz and a second one around 868 MHz.

According to another aspect of the invention, the device comprises an electrical supply unit arranged so as to provide an electrical power supply, the output characteristics of which are independent from the input characteristics, particularly a power supply by batteries or a switch-mode power supply.

According to another aspect of the invention, the device comprises a transmitter, the processing unit being arranged in order to configure the transmitter where appropriate.

In the case where the device comprises a transmitter, for example an order transmitter such as comprised in a remote control or an emitting portion of a transceiver of an electromechanical actuator, a configuration is achieved for the transmitter. This configuration allows parametrizing the communications returning from the device towards a source in the case of a bidirectional protocol.

The present invention also relates to an electromechanical actuator for a building mobile equipment comprising a communication device such as described above, and a motor, a control unit able to be distinct or combined with the processing unit being arranged to control the motor depending on signals received by the receiver.

The present invention also relates to a bidirectional remote control for the remote control of an actuator for a building mobile equipment comprising a communication device such as described previously.

BRIEF DESCRIPTION OF THE DRAWINGS

In any case, the invention will be better understood with the following description, with reference to the accompanying schematic drawing representing, by way of non limiting example, several embodiments of a device according to the invention.

FIG. 4 is a table illustrating different communications modes corresponding to frequency bands and distinct types of protocols.

DETAILED DESCRIPTION

Figure 1:
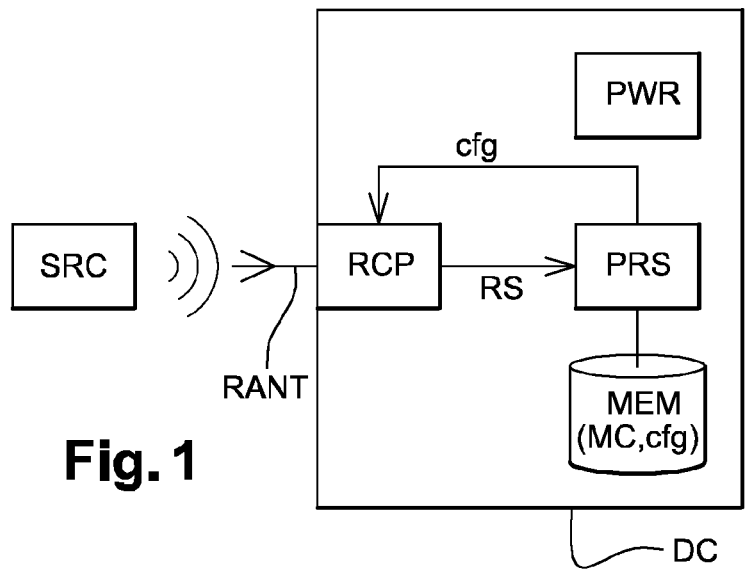
FIG. 1 is a diagram representing a first embodiment of a communication device according to the invention.

According to an embodiment represented in FIG. 1, a communication device DC according to the invention comprises a receiver RCP, associated with a receiving antenna RANT and a data processing unit PRS intended to receive and process the signals from the receiver RCP.

The receiver RCP is in this embodiment an analog radio-frequency receiver or a digital radio-frequency receiver, for example in the case where a protocol of type RTS must be used.

The communication device is arranged in such a manner as to interpret received signals according to a plurality of communications modes MC1 to MCp selectively usable by the communication device DC. Thus, the communication device implementing the invention selects a communication mode from among the usable communication modes and then interprets the received signals according to this communication mode.

Here, it is meant by (configuration or operational) communication mode the use of a particular communication protocol Pj in a particular frequency band BFk, as is illustrated in FIG. 4. Of course, the number of usable communication protocols and the number of frequency bands may vary according to the embodiments. The different communication modes are symbolized by using an index i, j, and thus by designating the communication modes as the modes MCi, MCj, the indexes i, j, able to vary from 1 to p, in order to facilitate the explanation. Likewise, the different protocols P and the frequency bands BF can be represented by an index. References MC, BF and P may however be used according to the cases with or without an index.

Thus, the distinct communication modes MCi may correspond to different types of communication protocols Pj, namely for example the communication protocols RTS®, io-homecontrol®, Zigbee® or z-wave®.

Likewise, the distinct communications modes may correspond to communications on distinct frequency bands BFk.

It appears that the receiver RCP, which is for example a radio-frequency receiver, is able to operate on several frequency bands BFk, for example frequency bands defined around the following nominal frequencies: 433/868/915/960MHz. The antennas RANT equipping the receiver are not always efficient on the set of the considered frequencies. In this case, types of device DC may be provided for distinct frequency bands, for example, a device functioning for the frequency bands BF ranging between 315 and 433 MHz, and a device functioning for the frequency bands BFk ranging between 868 and 960 MHz.

In the case of using an antenna functioning on the set of frequencies, the same device may be used on the set of frequencies.

By way of example, in the frequency band 868 MHz to 960 MHz: the band called "ISM" at 868 MHz is used in Europe, the band at 915 MHz is used particularly in the USA, and the band at 960 MHz is used in Israel.

As indicated in FIG. 1, the processing unit PRS is arranged in order to configure the receiver RCP so as to allow a reception in a frequency band BF. Thus, the different technical values of the configuration parameters cfg of the receiver RCP allow it to operate on different frequencies for a given type of antenna. These parameters are stored in a MEM memory associated with the processing unit PRS. The processing unit comprises other non represented elements as in particular, a clock circuit allowing calculation of time-outs.

The device further comprises an electrical power supply unit PWR arranged in such a manner as to provide an electrical power supply, the output characteristics of which are independent from the input characteristics, particularly, a power supply by batteries or a switch-mode power supply.

The use of a switch-mode power supply allows using downstream of this power supply components that are identical whatever the input voltage of the switch-mode power supply. These arrangements allow making the device compatible with the power grid of the country in which it is installed. A switch-mode power supply may in particular be used when the device is integrated into an actuator as will be described hereinafter. In the case of the integration of the device into a bidirectional remote control as will also be detailed, cells or batteries may ensure a power supply, the characteristics of which are independent from the local power grid.

The functioning of the communication device will now be described. As already mentioned, the communication device DC presents two distinct functioning modes, a configuration functioning mode F1 and an operational functioning mode F2.

The purpose of the first configuration functioning mode F1 of the communication device DC is the definition of the operational communication mode MUO which must be used by the device.

The second operational functioning mode F2 corresponds to the interpretation of the received signals as commands to be executed by the actuator, for example "up", "stop", "down", or as information from the sensors, or even as error reports received at the remote control or the dedicated tool.

In the case of the bidirectional communication devices, the operational functioning mode F2 may also correspond to the emission by the actuator of the signals comprising reports of execution of the commands.

The processing unit PRS is arranged to implement its first configuration functioning mode F1 particularly in the following cases:

during the first powering-on of the device, in particular in factory mode;

on the initiative of an installer, during the installation or an update on-site, in particular during a maintenance operation, or during a regulatory change, corresponding for example to authorized communication protocols or new frequency bands.

on the initiative of a user, during an update by means of an internet connection to a server and a man-machine interface which can be integrated into the device or which can be remote.

during an update triggered by the software embedded in the processing unit, the triggering of the update being caused by an event such as detection of an error in the functioning of the actuator or even during a self-test performed by the software.

In this first configuration functioning mode F1, the communication device DC is arranged so as to analyze received signals RS by the receiver RCP from a source SRC in such a manner as to determine whether at least one sequence of the received signal RS may be interpreted as being compliant with a communication mode MCi from among the plurality of configuration communication modes MC1 to MCp usable by the communication device DC.

For example, the source SRC may be a unidirectional remote control. The signals are transmitted for example by pressing on a key of the remote control which activates the sending of signals corresponding to a determined communication mode MCi, that is to say, of frames according to a determined communication protocol Pj in a determined frequency band BFk.

Figure 5:
FIG. 5 illustrates an example of frame format which can be used for the control of an actuator of a building mobile equipment.

An example of frame compliant with a configuration or operational communication mode usable by a communication device is described with reference to FIG. 5.

Such a frame TR is introduced for example by synchronizing pulses, and comprises:

logical synchronization data SYNC, which allow detecting the beginning of the frame, addressing data ADDR which allow identifying the transmitter and/or the recipient(s) of the frame, data constituting a payload PLD, the content of which depends on the type of the performed command/operation.

data related to an error check code, for example a cyclic redundancy code CRC, optional additional data ADD, comprising for example an encryption key.

According to the used type of frame, the number of fields, their length and their content may change. It is thus possible to identify whether a frame is compliant with a given protocol and is a valid frame, for example by comparing the conformity of a sequence of the received signal RS with the preamble comprising the synchronization data SYNC of a frame compliant with the type of protocol Pj corresponding to a particular communication mode.

The recognition of this preamble allows confirming that the radio-frequency decoding, the decoding of the binary elements, the Flow rate and the sequence of the signal are compliant with that of the selected communication mode, which in most cases is sufficient for its characterization.

It is also possible to carry out a calculation of an error check code, and to compare the result of the calculation with the value of the error check code CRC comprised in the frame, or to check whether the length of the frame and the format thereof corresponds to a given type of protocol. Other characteristics concerning the frequency, the modulation, the Flow rate of the received signal, which are characteristic of a given type of protocol, can be analyzed by the communication device.

After the recognition of at least one sequence of the received signal RS compliant with a usable configuration communication mode, the communication device DC defines this communication mode as identified configuration communication mode MCi.

According to a first alternative embodiment, the definition of the operational communication mode MUO is achieved by defining the operational communication mode MUO as being the identified configuration communication mode MCi.

According to a second alternative embodiment, the definition of the operational communication mode MUO is achieved implicitly with respect to the received signal RS according to a configuration communication mode MCi. To this end, the processing unit stores in its memory MEM data related to relationships $MUOk=f(MCj)$ between received signals corresponding to the configuration communication modes MCj and operational communication modes MUOk.

Figure 6:
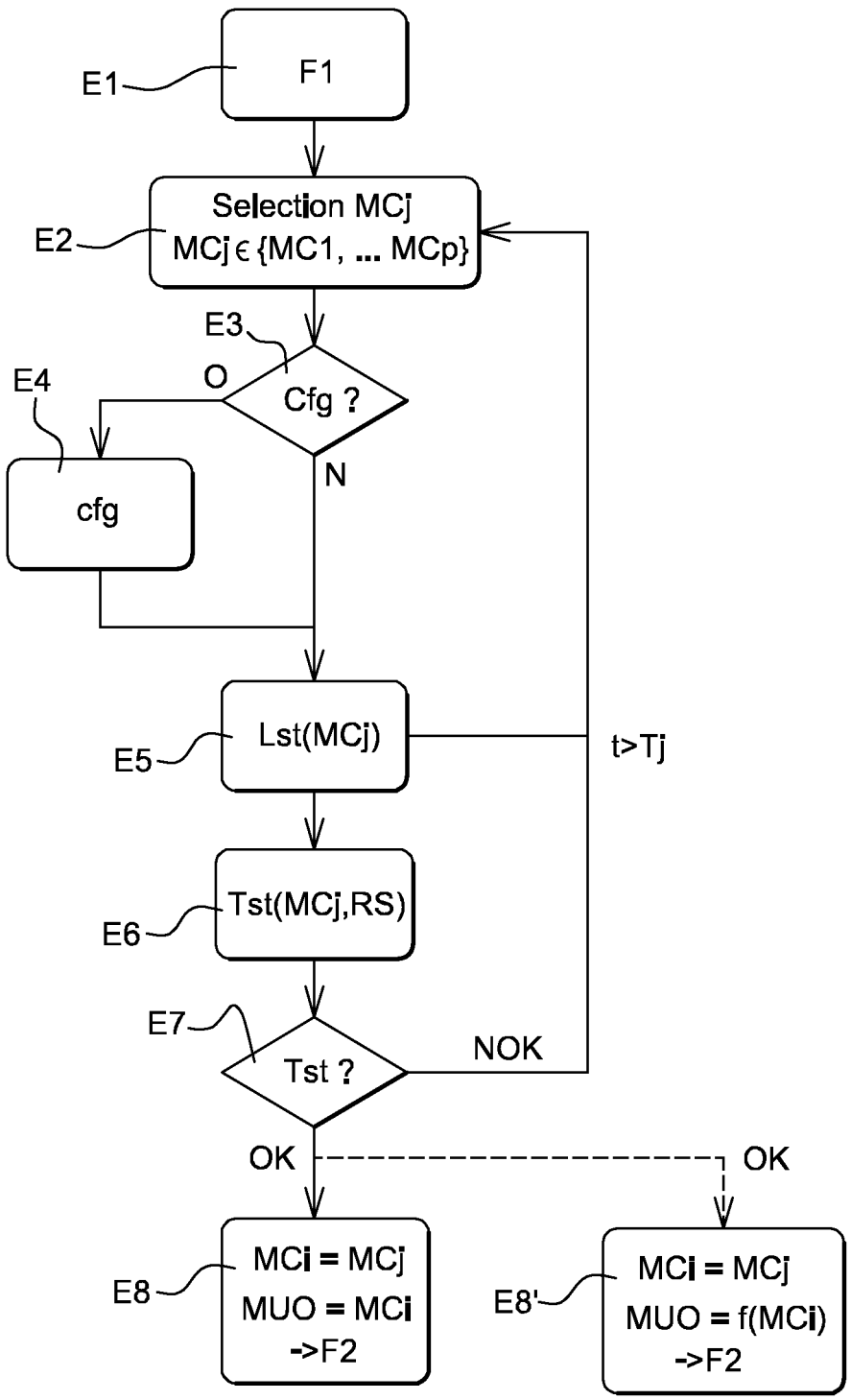
FIG. 6 is a Flowchart of a method according to the invention.

The functioning of the communication device DC corresponds to the implementation of a method, the steps of which are described below with reference to FIG. 6.

In a first step E1, the first functioning mode F1 is selected with the final purpose of determining an operational communication mode MUO to be used for the operational functioning F2 of a communication device DC.

In a second step E2, a configuration communication mode MCi is selected from among a plurality of configuration communication modes MC1 to MCp able to be used by the communication device DC.

In a third step E3, a test is carried out in order to identify whether a change in configuration of the receiver component RCP is necessary in order to take into account this configuration communication mode MCj.

If the response is positive, a fourth step E4 of configuration is carried out. If not, the fifth step E5 is carried out.

In the fourth step E4, the technical configuration parameters cfg of the receiver component RCP are adjusted by the communication device DC, which stores in a memory MEM these parameters for each communication mode. The configuration is particularly necessary when the current communication mode corresponds to a frequency band BFk, to a Flow rate or a modulation different from that of the previously used communication mode or during the first use of the communication device DC.

In a fifth step E5, a listening operation Lst is carried out, in order to capture a signal possibly sent by a source SRC. This listening step ends when a signal RS is received or when a determined period of time Tj has passed without receiving a signal. In the case where a signal RS is received, a sixth step E6 is carried out. In the case where a predetermined period of time Tj has passed without receiving a signal, the method loops on the second step E2 in which a selection of a different configuration communication mode is carried out.

In the sixth step E6, a testing operation Tst is carried out in order to identify whether the received signal RS is likely to be interpreted as being compliant with the configuration communication mode MCj, as described above.

In a seventh step E7, a checking of the test result Tst is carried out. If the test result is positive, the current configuration communication mode MCj is defined as an identified configuration mode MCi and an eighth step E8 is carried out. If the test result is negative, the method loops on the second step E2 in which a selection of a different configuration communication mode is carried out.

In the eighth step E8, the identified configuration mode MCi is selected as an operational communication mode MUO to be used in the second functioning mode of the system F2 by the communication device DC. The communication device then passes automatically to this second operational functioning mode F2, in which the communication device DC is arranged so as to interpret the received signals RS as control signals in accordance with the operational communication mode MUO defined in the first functioning mode F1.

According to an alternative embodiment of the method represented as step E8', a step is carried out in which the operational communication mode MUO is determined implicitly with respect to the identified configuration communication mode CMi. To this end, data stored in the memory MEM of the device related to the user communication modes MUk as well as to relationships MUOk=f(MCj) between received signals corresponding to the configuration communication modes MCj and operational communication modes MUOk are used. The communication device DC then passes automatically to the operational functioning mode F2, as already explained, We will now describe with reference to FIGS. 2 and 3 embodiments of the invention usable in the case of the bidirectional communication modes, such as for example the communications modes using the io-homecontrol® protocol.

Figure 2:
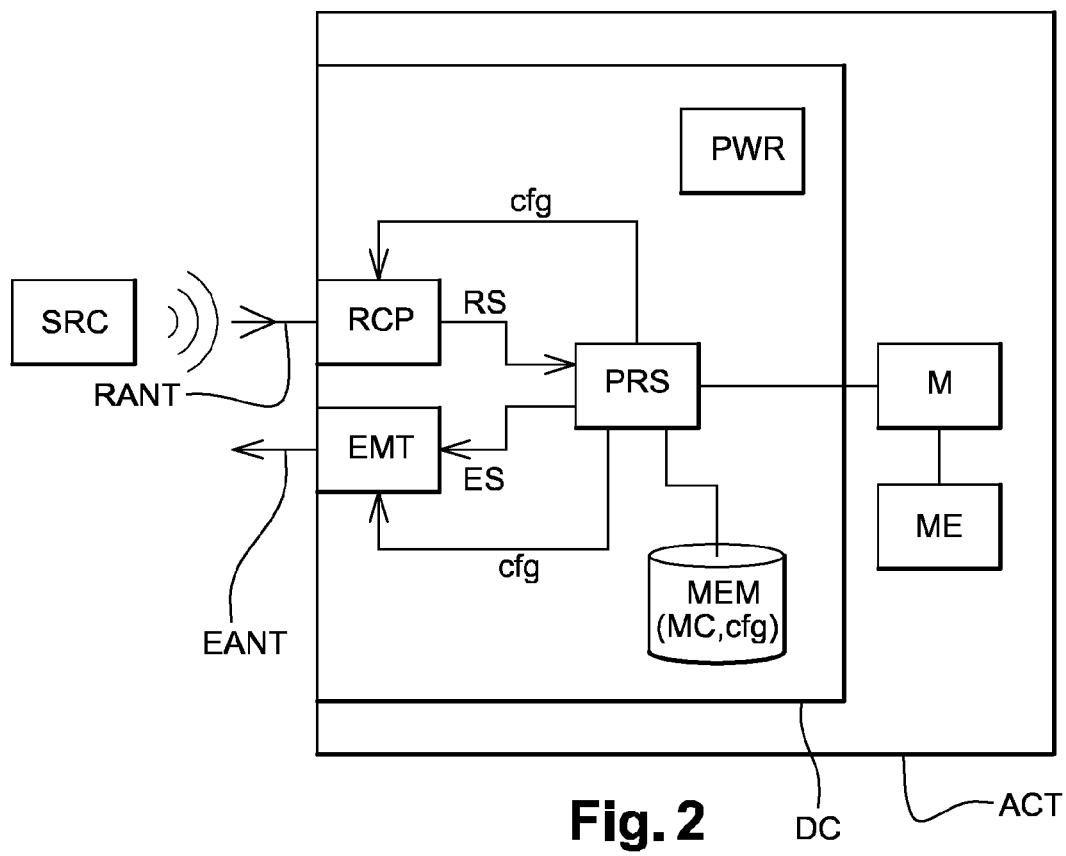
FIG. 2 is a diagram representing a second embodiment of a communication device allowing bidirectional communications according to the invention, integrated into an actuator of a building mobile equipment.

According to a second embodiment represented in FIG. 2, the device DC comprises, in addition to the receiver RCP, at transmitter EMT, associated with an emitting antenna EANT, the communication device DC being arranged to configure the transmitter EMT where appropriate.

In this case, the communication device DC proceeds to the configuration of both its transmitter EMT and its receiver RCP in order to ensure a reception and an emission in (one) determined frequency band(s).

This communication device DC is integrated into an electromechanical actuator. The actuator comprises a motor M, a control unit arranged to control the motor M depending on signals received by the receiver RCP in the second operational functioning mode F2 of the device. This control unit may be distinct or combined with the communication device DC.

Figure 3:
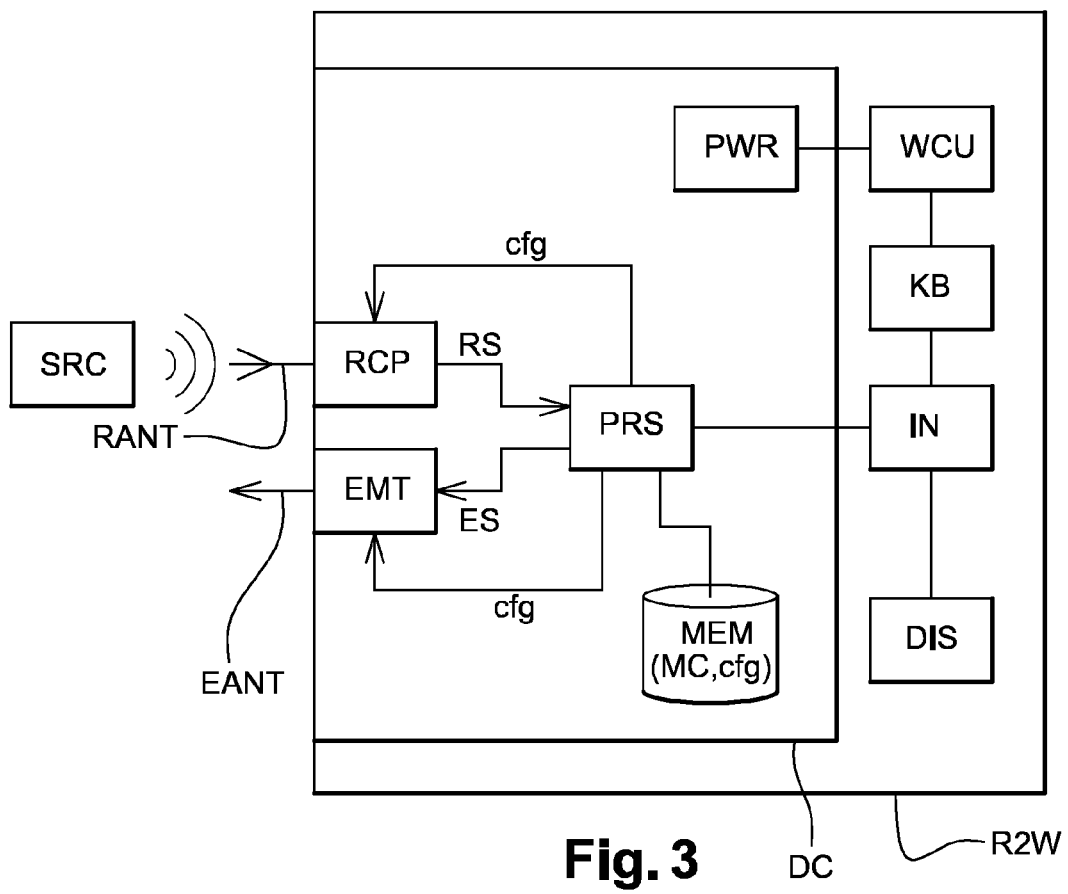
FIG. 3 is a diagram representing a second embodiment of a device according to the invention integrated into a remote control allowing bidirectional communications.

According to a third embodiment represented in FIG. 3, the communication device DC comprises the same members as in the second embodiment. The control device is integrated into a bidirectional remote control R2W. Such a remote control comprises a user interface IN comprising a control keyboard KB and possibly a screen DIS for displaying information to a user. These two elements can also be combined in the form of a touch screen.

The elements of the user interface IN are connected to the communication device DC.

The remote control can also comprises a wake-up control unit WCU, which aims at activating the processing unit PRS, the radio-frequency transmitter EMT, and the receiver RCP when a key of the keyboard is pressed, by connecting these members to the power supply unit PWR.

These arrangements allow consuming energy only when a control signal must be emitted. The receiving means are generally active only for a short period of time after the emission of a signal by the transmitter, in order to collect a signal emitted in response by the device recipient of the control signal.

Within the scope of an implementation of the first configuration functioning mode F1 of a device according to the invention, it may thus be necessary to provide the actuation of a specific key by the user in order to "wake up" the remote control, R2W and therefore allow the power supply of the processing unit PRS and the receiver RCP by the power supply unit PWR.

A signal should be then provided to the receiver RCP in order to allow recognition of the communication mode.

This signal may be emitted by a source SRC comprising for example a unidirectional remote control, by a dedicated tool or by an actuator according to the state of the art, or an actuator according to the invention, the communication device of which has been previously configured and the operational communication mode of which is determined.

Regarding the realization of the transmitter, the processing unit and possibly the receiver contained in the device, it appears that these different elements may be contained on a same printed circuit, or realized separately.

The aforementioned functions, namely in particular, the demodulation of the signals (for example RF signals), the decoding/checking of the frame format, the definition of the operational communication mode, the interpretation of the received signals as control and/or monitoring signals, can be realized in a one-circuit configuration which comprises a sub-set dedicated to the communication functions (in particular RF), a wired logic optional part and a processor, or even a two-circuit configuration comprising for example:

a first circuit comprising the communication functions and a wired logic part, and a second circuit comprising the processor, or even a first circuit comprising the communication functions and a second circuit comprising a wired logic part and the processor, or even a first circuit comprising the communication functions and a second circuit comprising the processor.

It appears that the decoding and checking operations of the error correction code can be achieved by the communication component, by a wired logic circuit part or by a generic processor.

It should be noted that the use of the devices according to the invention does not further complicate the manufacture and calibration process of the devices. Particularly, during the validation of a device on a given frequency, an adjustment of the functioning frequency is achieved by modifying the configuration of a quartz present in the receiver component.

Obviously, it appears that the different embodiments detailed above only constitute examples of implementations of the invention as defined by the appended claims. Alternatives of these different embodiments may be considered and the different described embodiments can be easily combined by those skilled in the art.

The invention claimed is:

1. A functioning method of a communication device for a remote control of an actuator for a building mobile equipment comprising:
    a) analyzing a first received signal in order to determine whether at least one sequence of the first received signal can be interpreted as being compliant with a configuration communication mode usable by the communication device;
    b) upon receiving at least one sequence of the first received signal compliant with the configuration communication mode, defining said configuration communication mode as an identified configuration communication mode;
    c) defining an operational communication mode depending on the identified configuration communication mode;
    d) receiving a second signal according to the operational communication mode; and
    e) interpreting the second received signal in accordance with the operational communication mode, so as to identify control data in the second received signal,
    wherein the analysis of the first received signal for determining whether at least one sequence of the first received signal can be interpreted as being compliant with said configuration communication mode comprises a checking of a conformity of the sequence of the first received signal with a frame format of a type of protocol corresponding to said configuration communication mode.

2. The method according to claim 1, wherein a definition of the operational communication mode is achieved depending on the identified configuration communication mode on an one hand, and a data related to predetermined relationships between configuration communication modes and operational communication modes on the other hand.

3. The method according to claim 1, wherein a definition of the operational communication mode is achieved by defining the operational communication mode as being the identified configuration communication mode.

4. The method according to claim 1, wherein the analysis of the first received signal as sequence compliant with said configuration communication mode comprises:
   a') Selecting a particular configuration communication mode from among a plurality of configuration communication modes usable by the communication device,
   b') Waiting for a reception of a signal during a determined time interval,
   c') When no signal is received within the determined time interval, returning to step a') of selecting the particular configuration communication mode by selecting another configuration communication mode from among the plurality of configuration communication modes usable by the communication device,
   d') when the signal is received within the determined time interval, proceeding to an attempt of interpreting the received signal according to the selected configuration communication mode;
   e') when at least one sequence of the received signal can be interpreted as being compliant with the selected configuration communication mode, defining said selected communication mode as the identified configuration communication mode;
   f) when the received signal is not interpreted as being at least partly compliant with the selected configuration communication mode, returning to step a') of selecting the particular configuration communication mode by selecting another configuration communication mode from among the plurality of configuration communication modes (MCI to MCp) usable by the communication device.

5. The method according to claim 4, wherein the configuration of the communication device is achieved subsequently to the selection of the configuration communication mode.

6. The method according to claim 1, wherein distinct configuration communication modes (MC1 to MCp) usable by the communication device correspond to different types of communication protocols.

7. The method according to claim 1, wherein distinct configuration communication modes (MC1 to MCp) usable by the communication device correspond to communications on distinct frequency bands.

8. The communication device for the remote control of the actuator for the building mobile equipment comprising a receiver and a data processing unit intended to receive a signal from the receiver and interpret the received signal in accordance with the communication mode, the communication device being arranged to implement a method according to claim 1.

9. The device according to claim 8, wherein the data processing unit is arranged in order to configure the receiver so as to allow a reception within a determined frequency band.

10. The device according to claim 8 comprising a transmitter, the data processing unit being arranged in order to configure the transmitter where appropriate.

11. A bidirectional remote control for the remote control of the actuator for the building mobile equipment comprising the communication device according to claim 10.

12. The actuator for the building mobile equipment comprising the communication device according to claim 8, and a motor, a control unit able to be distinct or combined with the data processing unit and being arranged to control the motor depending on signals received by the receiver according to the operational communication mode.

13. A functioning method of a communication device for a remote control of an actuator for a building mobile equipment comprising:
   a) analyzing a first received signal in order to determine whether at least one sequence of the first received signal can be interpreted as being compliant with a configuration communication mode usable by the communication device;
   b) upon receiving at least one sequence of the first received signal compliant with the configuration communication mode, defining said configuration communication mode as an identified configuration communication mode;
   c) defining an operational communication mode depending on the identified configuration communication mode;
   d) receiving a second signal according to the operational communication mode; and
   e) interpreting the second received signal in accordance with the operational communication mode, so as to identify control data in the second received signal,
   wherein the analysis of the first received signal for determining whether at least one sequence of the first received signal can be interpreted as being compliant with said configuration communication mode comprises a checking of a conformity of a sequence of the first received signal with a preamble of a frame belonging to a type of protocol corresponding to said configuration communication mode.

14. A functioning method of a communication device for a remote control of an actuator for a building mobile equipment comprising:
   a) analyzing a first received signal in order to determine whether at least one sequence of the first received signal can be interpreted as being compliant with a configuration communication mode usable by the communication device;
   b) upon receiving at least one sequence of the first received signal compliant with a configuration communication mode, defining said configuration communication mode as an identified configuration communication mode;
   c) defining an operational communication mode depending on the identified configuration communication mode;
   d) receiving a second signal according to the operational communication mode; and
   e) interpreting the second received signal in accordance with the operational communication mode, so as to identify control data in the second received signal,
   wherein the analysis of the first received signal for determining whether at least one sequence of the first received signal can be interpreted as being compliant with said configuration communication mode comprises a comparison between an error check code calculated from data of the received signal on an one hand and a value of the error check code comprised within a frame of received signal on the other hand.

* * * * *